(12) United States Patent
Yee et al.

(10) Patent No.: US 7,684,199 B2
(45) Date of Patent: Mar. 23, 2010

(54) FREE-WHEELING CLUTCH FOR A MOTOR CONTROL CENTER SUBUNIT HAVING MOVEABLE LINE CONTACTS

(75) Inventors: Edgar Yee, Chapel Hill, NC (US); Robert A. Morris, Fayetteville, NC (US); Daniel J. Leeman, Fuquay-Varina, NC (US); Daniel B. Kroushl, Clayton, NC (US); George Norman Russ, Fayetteville, NC (US)

(73) Assignee: Eaton Corporation, Cleveland, OH (US)

( * ) Notice: Subject to any disclaimer, the term of this patent is extended or adjusted under 35 U.S.C. 154(b) by 237 days.

(21) Appl. No.: 11/863,067

(22) Filed: Sep. 27, 2007

(65) Prior Publication Data

US 2009/0086414 A1    Apr. 2, 2009

(51) Int. Cl.
*H05K 7/16* (2006.01)
(52) U.S. Cl. .................................. 361/725; 361/608
(58) Field of Classification Search ................ 361/608, 361/724, 725, 726
See application file for complete search history.

(56) References Cited

U.S. PATENT DOCUMENTS

| | | | | |
|---|---|---|---|---|
| 3,469,043 A | | 9/1969 | Wilson | |
| 4,090,230 A | * | 5/1978 | Fuller et al. ................. | 361/617 |
| 4,178,624 A | * | 12/1979 | Wilson et al. ............... | 361/611 |
| 4,502,097 A | * | 2/1985 | Takahashi ................... | 361/614 |
| 4,693,132 A | | 9/1987 | Buxton et al. | |
| 4,728,757 A | | 3/1988 | Buxton et al. | |
| 4,743,715 A | * | 5/1988 | Gerbert-Gaillard et al. ........................ | 200/50.26 |
| 4,789,344 A | * | 12/1988 | Fritsch et al. ................. | 439/43 |
| 4,789,919 A | | 12/1988 | Cox et al. | |
| 5,337,210 A | * | 8/1994 | Ishikawa et al. ............ | 361/608 |
| 5,510,960 A | * | 4/1996 | Rosen ......................... | 361/823 |
| 6,087,602 A | * | 7/2000 | Bernier et al. ............ | 200/50.11 |
| 6,207,909 B1 | * | 3/2001 | Tallman et al. ............ | 200/50.02 |
| 6,864,443 B1 | * | 3/2005 | Bruchmann ............... | 200/50.01 |
| 7,544,908 B2 | * | 6/2009 | Webb et al. ............... | 200/50.24 |
| 2006/0067018 A1 | | 3/2006 | Malkowski, Jr. et al. | |

FOREIGN PATENT DOCUMENTS

DE    10006427 C2    8/2001

\* cited by examiner

*Primary Examiner*—Thanh-Tam T Le
(74) *Attorney, Agent, or Firm*—Ziolkowski Patent Solutions Group, SC

(57) ABSTRACT

A system and method for connecting supply power to motor control components includes use of a motor control center subunit with moveable supply power contacts. After a motor control center subunit is secured into a motor control center compartment, the supply power contacts may be advanced to engage supply power buses. For disconnection, the supply power contacts may be retracted and isolated from the buses before physical removal of the subunit. A free wheeling mechanism prevents supply power contacts from advancing and retracting past a preset travel range.

22 Claims, 12 Drawing Sheets

FREE-WHEELING CLUTCH FOR A MOTOR CONTROL CENTER SUBUNIT HAVING MOVEABLE LINE CONTACTS

BACKGROUND OF THE INVENTION

The present invention relates generally to motor control systems, and more particularly, to a motor control center subunit having a clutch system which governs the limits of extension and retraction of power circuitry within the motor control center subunit. In one embodiment, the system and method described herein allow translation of power circuitry along a threaded drive after full installation of the motor control center subunit into the motor control center. Translation of the power circuitry occurs between a position wherein the power circuitry is engaged with a power bus and a position wherein the power circuitry is retracted from the power bus. Once power circuitry reaches either the engaged or retracted position, the clutch system causes the drive to spin freely and thus prevents movement past either the engaged or retracted position.

A motor control center is a multi-compartment steel enclosure with a bus system to distribute electrical power, on a common bus system, to a plurality of individual motor control units mountable within the compartments. The individual motor control center subunits are commonly referred to as "buckets" and are typically constructed to be removable, pull-out units that have, or are installed behind, individual sealed doors on the motor control center enclosure. These buckets may contain various motor control and motor protection components such as motor controllers, starters, contactor assemblies, overload relays, circuit breakers, motor circuit protectors, various disconnects, and similar devices for electric motors. The buckets connect to the supply power lines of the motor control center and conduct supply power to the line side of the motor control devices, for operation of motors. Motor control centers are most often used in factories and industrial facilities which utilize high power electrical motors, pumps, and other loads.

Typically, when installing or removing motor control center buckets, the power supply lines are connected. To remove such a bucket, a deadfront door of the bucket or of the motor control center is opened and an operator manually pulls on the bucket to separate the primary disconnects, or "stabs," from the bus system, thereby disconnecting the power supply. Installation of a bucket is accomplished in a similar manner, wherein the operator manually pushes the bucket into a compartment of the motor control center to engage the bucket stabs with the bus system, thus connecting the system to supply power. The line connections or stabs may be difficult to maneuver manually when an operator is supporting the entire bucket or when the stabs are not visible.

Attempts have been made to improve upon the manual installation and disconnection of motor control center buckets and supply power connections from live supply power lines, risers, and/or a vertical bus of a motor control center. Other systems have employed pivotable handles inside the buckets to pivot line connectors to and from supply lines. However, many of these systems require that the bucket or compartment door be open to manipulate the handles and line stabs. Additionally, these systems can subject the pivot line connectors and other components to overdrive and/or overtorquing, as the system includes solid stops when manipulating the connectors between racking in and extracting out positions.

It would therefore be desirable to design a motor control center bucket assembly that overcomes the aforementioned drawbacks. Thus, it would be desirable to provide for remote connection or disconnection of the line stabs of a bucket to the power supply lines or bus of a motor control center from a distance. In the event of an arc or arc flash, any heated gas, flame, and/or the arc itself should preferably be contained behind the bucket compartment door or "deadfront." Furthermore, as connection or disconnection of the line stabs is to be completed remotely, it would be desirable to provide a means to prevent overdrive or overtorquing during remote connection or disconnection of the line stabs.

BRIEF DESCRIPTION OF THE INVENTION

The present invention provides a system and method for installing a motor control center subunit or bucket into a motor control center and electrically connecting motor control components of the bucket to a power supply. The system and method utilize moveable line stabs to engage the power supply (such as bus bars in parallel) after the bucket has been secured in the motor control center, in order to contain potential arc flashes. A clutch system defines the limits of movement of the line stabs within the motor control center.

Therefore, in accordance with one aspect of the present invention, a motor control center subunit includes a housing, a drive mechanism attached to the housing and configured to translate a plurality of selectively moveable conductive contacts between a retracted position and an extended position within the housing, and a freewheeling mechanism attached to the drive mechanism and configured to define the retracted position and the extended position of the conductive contacts. The conductive contacts are moveable when the housing is seated in a motor control center and a front panel of the housing is in a closed position.

In accordance with another aspect of the invention, a motor control center includes a motor control center frame having at least one compartment and a motor control center subunit housing constructed to seat in the at least one compartment of the motor control center frame. The motor control center also includes an actuating mechanism attached to the motor control center subunit to control movement of a plurality of conductive contacts and a clutch configured to define a range of movement of the plurality of conductive contacts, with the range of movement having ends at a fully engaged position and a fully retracted position.

According to a further aspect of the invention, a motor control center subunit includes a control module housing having a plurality of conductive contacts therein and an actuating mechanism to control movement of a plurality of conductive line contacts when a front panel of the housing is in a closed position. The motor control center subunit also includes a means for preventing the actuating mechanism from translating past a maximum extended position and a maximum retracted position.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The following description makes reference to supply power, supply power lines, motor power, load power, line power, and the like. It is appreciated that such terms may refer to a variety of both common and uniquely conditioned voltage and current characteristics, including but not limited to, three phase AC power, single phase AC power, DC power, multiple DC power lines, or any combination thereof. Such power characteristics will be generally referred to as being provided on a bus, supply line, or riser of a motor control center. However, it is appreciated that the present invention may find applicability in other power connectivity configurations, adapted or apart from motor control centers. An example of supply power commonly used in motor control centers is 480V three-phase AC power distributed over three separate supply bus bars. In addition, references to "motor control components" shall be understood to include the various types of devices and control components which may be housed in a motor control center bucket for connection to the supply power. Such devices and components include contactors, relays, motor controllers, disconnects, circuit protective devices, and the like.

Figure 1:
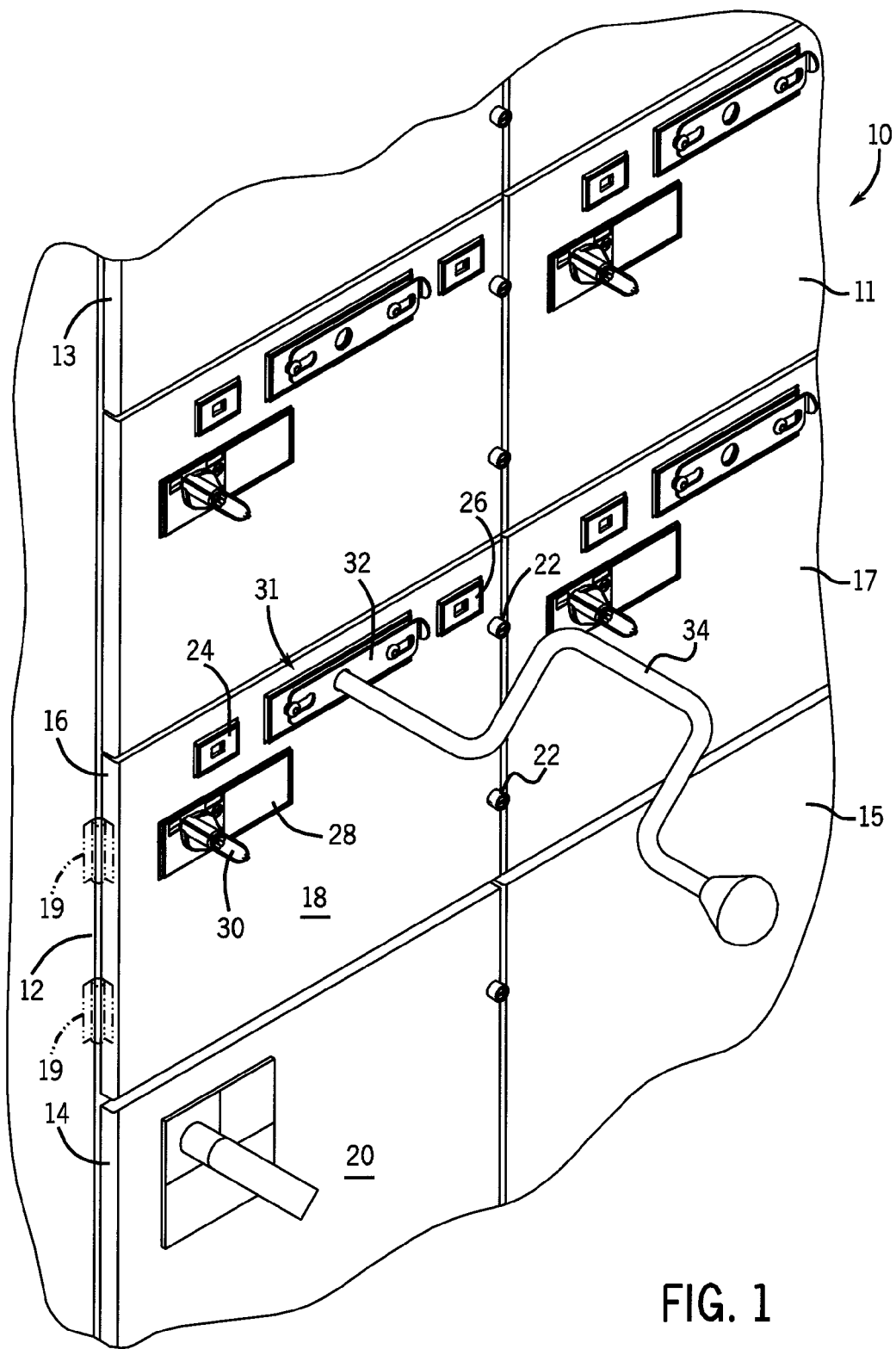
FIG. 1 is a partial perspective view of a motor control center subunit installed in a motor control center.

Referring to FIG. 1, a partial perspective view of a motor control center structure 10 is shown. As discussed above, motor control centers may include compartments or enclosures for multiple control modules or buckets 11, 13, 14, 15, 16, 17. Bucket 16 is shown fully installed into motor control center compartment or enclosure 12 such that its front panel 18 is seated securely against the periphery of enclosure 12 and flush with the front panel 20 of bucket 14, with front panel 18 being a dead front panel. In this regard, bucket 16 includes a number of latching mechanisms 22 on dead front panel 18 so that an operator may lock bucket 16 into place once installed. In some embodiments, dead front panel 18 may be a door having a set of hinges 19 in order to permit access to motor control components within bucket 16 while bucket 16 is installed in enclosure 12 of motor control center 10. However, even when closed or sealed, dead front panel or door 18 still permits access to circuit breaker assembly 28, stab indicator 24, shutter indicator 26, and line contact actuator 31. Line contact actuator 31 is a mechanism for engaging line contacts (FIG. 2) with line power from the motor control center 10. Thus, even when bucket 16 is fully installed in enclosure 12 and latches 22 have been secured, an operator may still use disconnect handle 30 and may open slide 32 to insert crank 34 to move one or more line contacts (not shown) of the bucket 16. When slide 32 is moved aside to permit access to actuating mechanism 31, door 18 is prevented from opening, thereby closing off access to components inside bucket 16. Additionally, a user may desire to padlock the slide 31 in the closed position, to further regulate who may operate actuating mechanism 31 and when.

Figure 2:
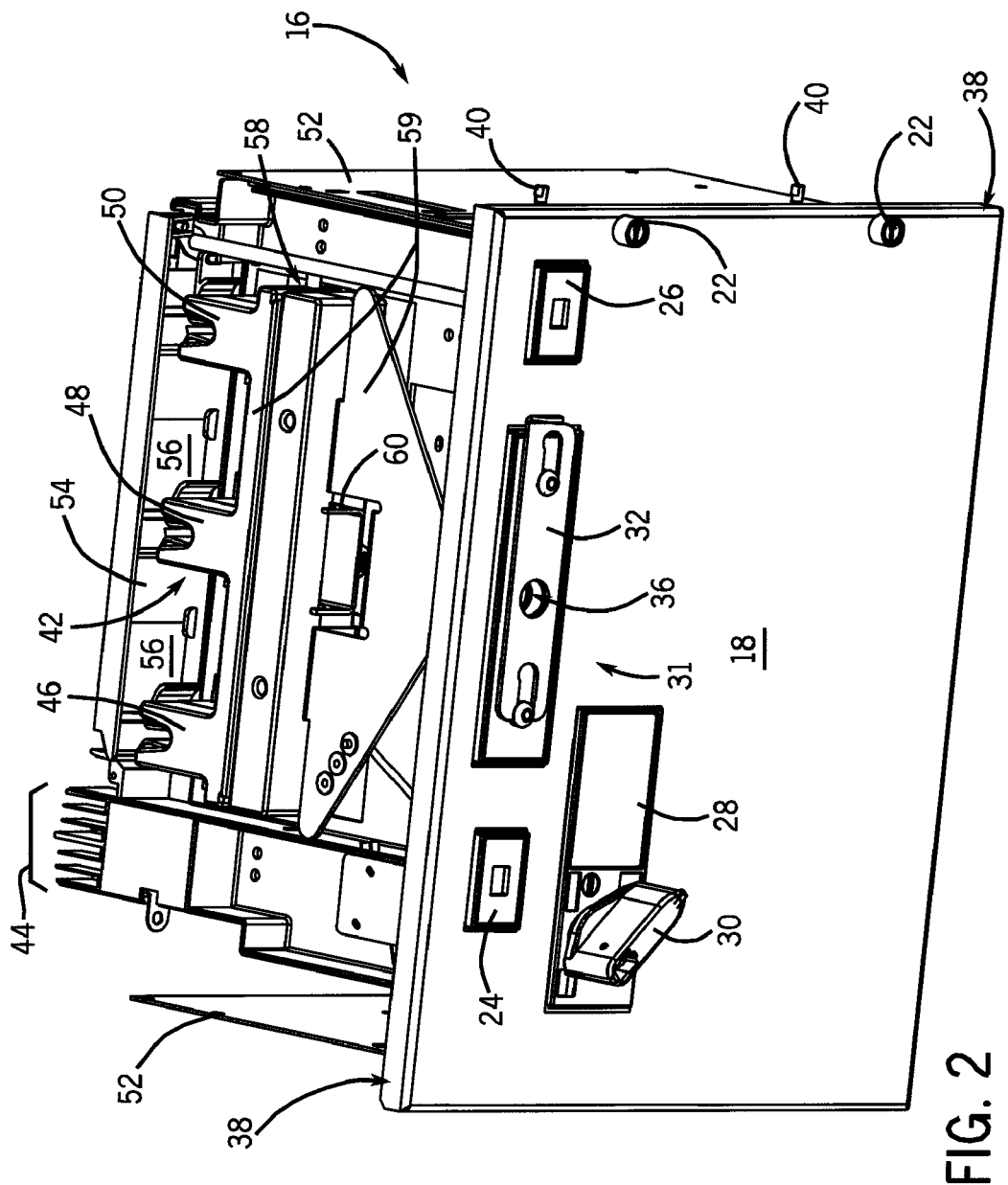
FIG. 2 is a perspective view of a motor control center subunit of FIG. 1, removed from the motor control center.

Referring now to FIG. 2, a perspective view of a motor control center bucket 16 is shown. It is noted that bucket 16 may have a housing that includes a number of panels surrounding bucket 16 to fully or partially enclose the components thereof. As shown, bucket 16 includes a pair of side panels 52 and a dead front panel 18, which support motor control devices and internal bucket components. An upper panel and a rear panel have been removed to show the internal components of bucket 16. Dead front panel 18 is configured to fit snugly and securely within a motor control center such that a rim 38 of the dead front panel 18 seats against the inner periphery (not shown) of a motor control center enclosure. For purposes of dust protection, rim 38 may optionally include a compressible or flexible seal, such as a rubber seal, or other gasket-type component. Once bucket 16 is inserted into a motor control center enclosure, latch mechanisms 22 may be turned with a key, a screwdriver, or by hand so that latch arms 40 abut an inner surface of the outer periphery (not shown) of an enclosure to hold bucket 16 in place and/or prevent bucket 16 from being removed. Similarly, an automatic retention latch 60 is shown in an engaged position. Upon advancement of line contacts or stabs 46, 48, 50 automatic retention latch 60 is triggered to engage a frame or lip of the motor control center unit in which bucket 16 is installed.

When slide 32 of line contact actuator 31 is moved aside, an opening 36 is exposed. Opening 36 preferably has a unique configuration to accept a specialized crank 34 (as shown in FIG. 1). In other embodiments, to be described below, a manually drivable handle may extend through opening 36 or a remotely operable motor may be the actuator 31. When slide 32 is moved aside as shown, slide 32 extends over a portion of dead front panel 18. Thus, in embodiments in which dead front panel 18 is a hinged door, moving slide 32 to expose opening 36 will inhibit a user from opening dead front panel 18.

Bucket 16 also includes a number of conductive contacts or stabs 44, 46, 48, 50. Control power contact 44 is preferably fixedly attached to the rear of bucket 16, whereas supply power stabs 46, 48, 50 are moveable with respect to bucket 16. However, it is appreciated that control power contact 44 may also be moveable in a similar manner to line power stabs 46, 48, 50. Control power contact 44 is of a suitable construction to conduct a control power (typically a few volts) to motor control components (not shown) disposed within bucket 16.

In embodiments where control power contact 44 is permanently positioned at the rear of bucket 16, control power contact 44 will engage a control power supply line or bus upon installation of bucket 16 into a motor control center.

Supply power stabs 46, 48, 50, on the other hand, do not initially engage supply power lines or buses when bucket 16 is installed into a motor control center. Rather, stabs 46, 48, 50 are initially in retracted position 42, as shown in FIG. 2, disposed inside bucket 16. One skilled in the art will appreciate that a number of configurations of supply power stabs 46, 48, 50 may be utilized. In the embodiment shown, stabs 46, 48, 50 are shaped to grasp about a supply line, bus, or riser of the motor control center 10 of FIG. 1. A lien contact or stab assembly 58 (i.e., conductive contact assembly) includes a stab bracket 59 to which the stabs 46, 48, 50 are attached. Stab bracket 59 holds stabs 46, 48, 50 in an orientation for subsequent engagement with the supply power lines or buses of motor control center 10 of FIG. 1. It is recognized, however, that stab assembly 58 of FIG. 2 may include any number of configurations, such as for independently moveable stabs, for other than three stabs, or for actuation by other than a shaft, as will be described below. A shutter or isolator assembly 54 is disposed in the rear of bucket 16, between stab assembly 58 and the exterior of bucket 16. Isolator assembly 54 includes a number of moveable shutters 56 which operate to either expose or isolate the stabs 46, 48, 50 from the power lines or buses of the motor control center 10 of FIG. 1.

Figure 3:
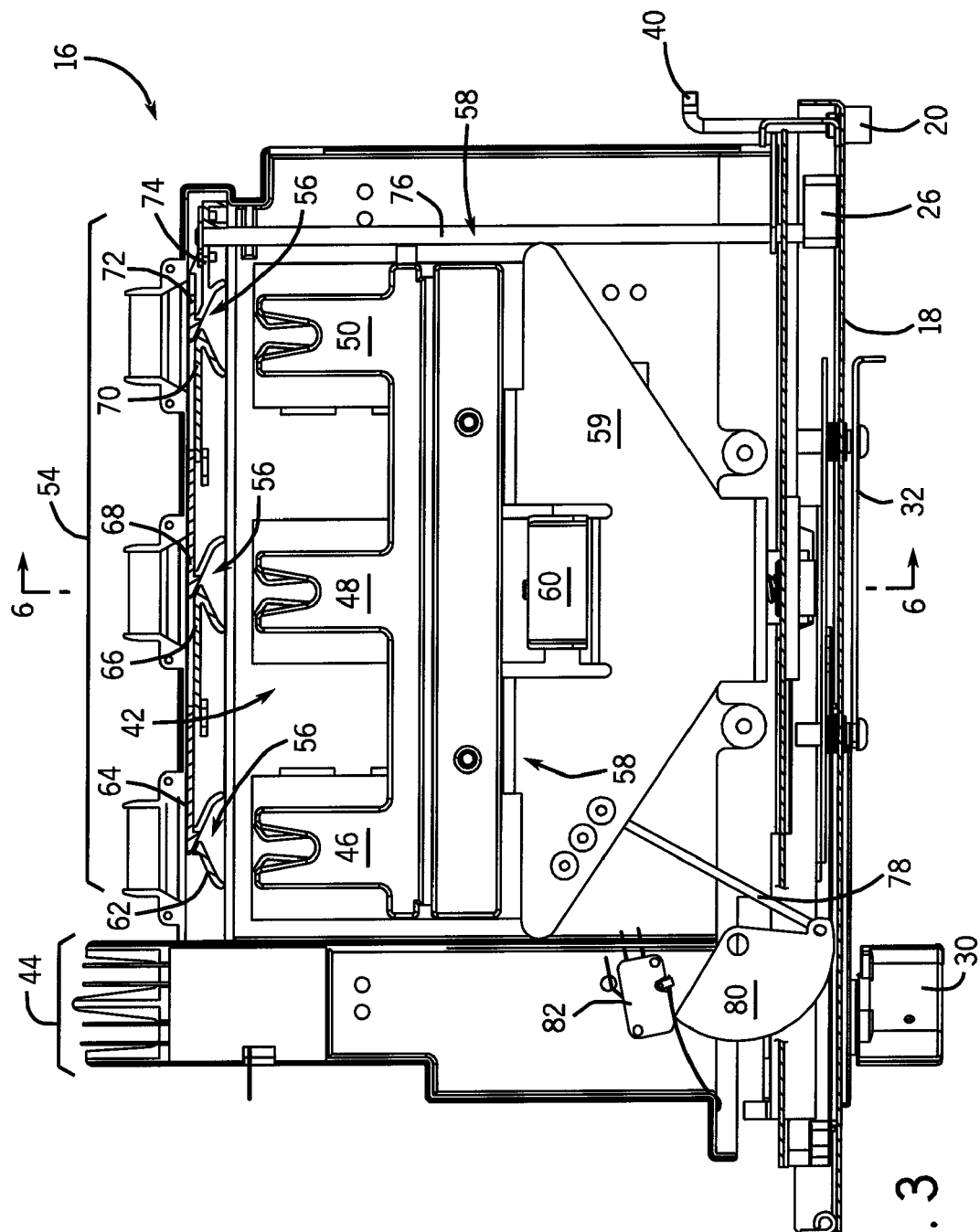
FIG. 3 is a top view of the motor control center subunit of FIG. 1 showing a number of stabs in a retracted position.

FIG. 3 depicts a top view of bucket 16, with all housing panels removed except for dead front panel or door 18. As shown, stab assembly 58 has positioned stabs 46, 48, 50 in a retracted position 42 wherein the stabs 46, 48, 50 are located inside bucket 16. Accordingly, shutters 56 of shutter assembly 54 are closed, isolating the stabs 46, 48, 50 from the supply power bus or line of a motor control center such as shown in FIG. 1. As shown in FIG. 3, each shutter 56 includes two separate shielding members 62 and 64, 66 and 68, 70 and 72. The shutter 56 for stab 46 includes a left shielding portion 62 and a right shielding portion 64, each being angled toward stab 46. Likewise the shutters 56 for stabs 48 and 50 include left shielding portions 66, 70 and right shielding portions 68, 72 respectively, each being angled toward the corresponding stab. However, the shutter 56 for stab 50 includes an additional mechanical connection 74. That is, a shutter arm 74 is provided to control a shutter indicating mechanism 76 which displays to an operator via dead front panel indicator 26 whether the shutters 56 are open or closed, as will be described in further detail below. Similarly, a cam or bell crank 80 is attached via rod 78 to stab assembly 58 to translate movement of the stab to a microswitch 82. Microswitch 82 operates to turn on and off the supply of control power from control power contact 44 to motor control components, such as contactors or overload relays (not shown), of bucket 16.

Figure 4:
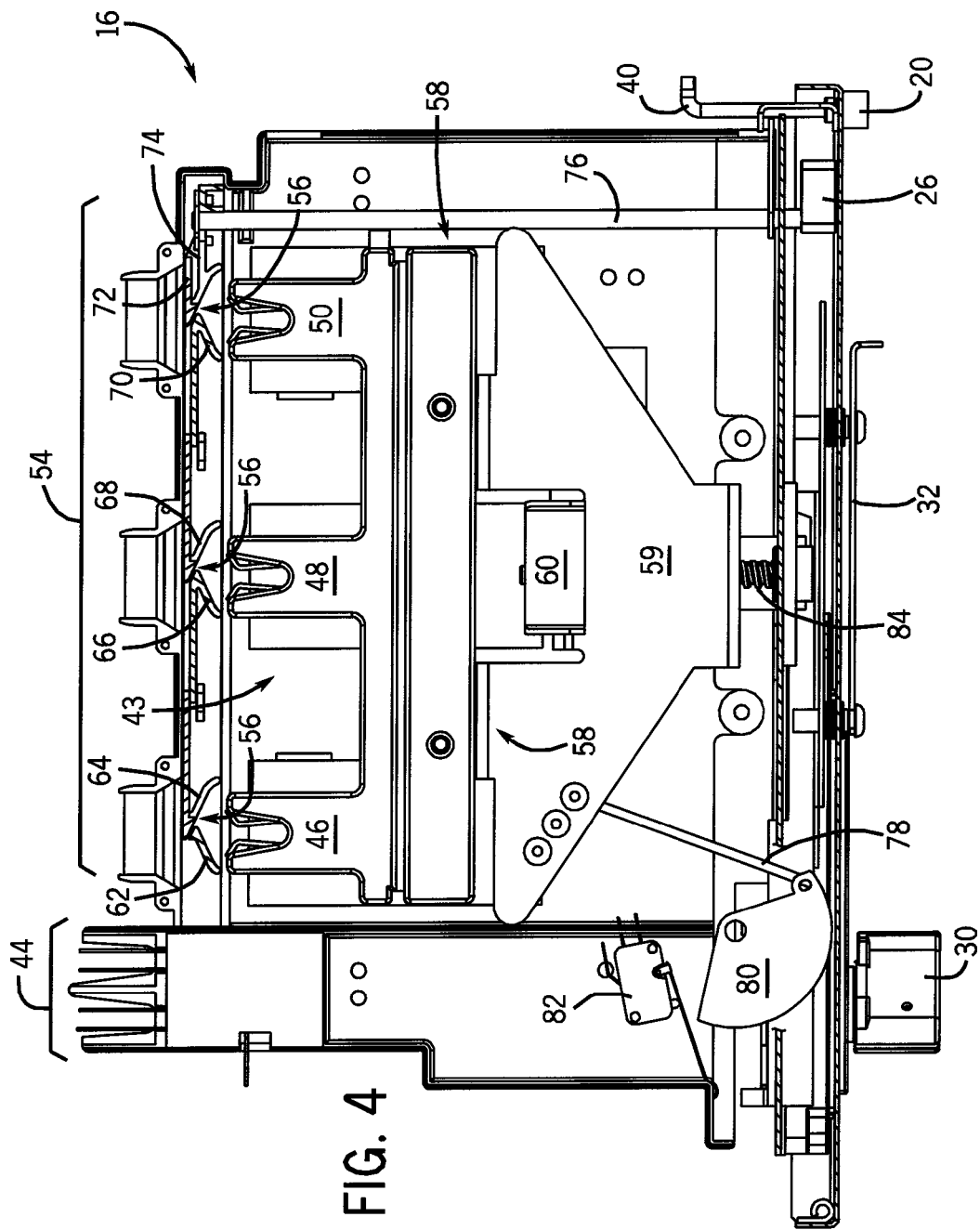
FIG. 4 is top view of the motor control center subunit of FIG. 3 showing the stabs in a test position.

Referring now to FIG. 4, the bucket 16 is shown having the stab assembly 58 in a test position 43. Stabs 46, 48, and 50 have been advanced to a point or test position 43 at which they nearly touch or just touch shutters 56, but shutters 56 are still closed. Since shutters 56 are closed, stabs 46, 48, 50 are isolated from supply power buses, thus preventing arcs from occurring between stabs 46, 48, 50 and the buses. Being in the test position, stab bracket 59 is moved forward such that actuating shaft or drive 84 is visible. Preferably, shaft 84 is a rotary drive shaft and is connected to the socket of opening 36 shown in FIG. 2 for operation via crank 34, shown in FIG. 1. Referring back to FIG. 4, during the advancement of stab assembly 58, automatic latch 60 has been triggered to engage the enclosure of the motor control center into which bucket 16 has been installed. Also due to the advancement of stab assembly 58, rod 78 is pulled by stab bracket 59 such that cam 80 has rotated away from microswitch 82. Microswitch 82 is thus actuated to permit control voltage from the control power contact 44 to a motor control component, such as a contactor or overload relay (not shown). It is appreciated, however, that microswitch 82, cam 80 and rod 78 are optional. In other words, embodiments of the present invention may simply permit control voltage to pass through control power contact 44 directly to motor control components immediately upon installation of bucket 16 into a motor control center when contact 44 engages a control power bus.

Figure 5:
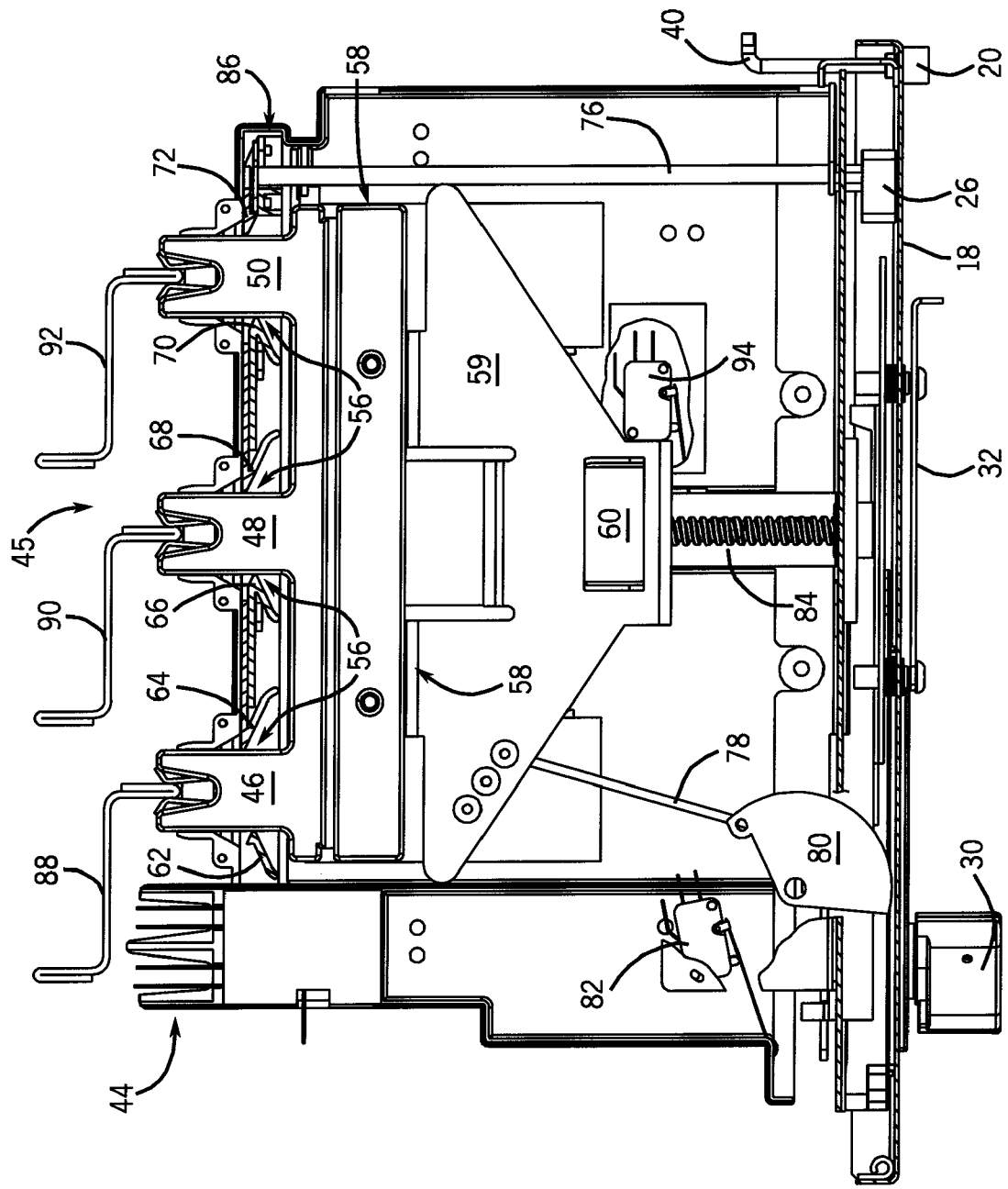
FIG. 5 is a top view of the motor control center subunit of FIG. 4 showing the stabs in an extended position.

FIG. 5 depicts another top view of the bucket 16 wherein the stabs 46, 48, 50 are in an extended/engaged position 45. In operation, stabs 46, 48, 50 are advanced or extended from the test position 43 of FIG. 4 towards shutters 56 and impinge upon angled portions 62-72 of the shutters 56. As the stabs 46, 48, 50 are forced forward into and against the surfaces of shutters 56, the stabs 46, 48, 50 separate the left angled portions 62, 66, 70 and right angled portions 64, 68, 72 of the shutters 56 to expose the stabs 46, 48, 50 to supply power buses 88, 90, 92, respectively. Preferably, a biasing or closure force is provided to bias the right angled portions 64, 68 72 and the left angled portions 62, 66, 70 towards one another, so that the shutters 56 automatically close upon retraction of stabs 46, 48, 50. It is recognized that numerous other ways of opening and closing shutters 56 are possible and contemplated. For example, rather than employing two shutter portions for each shutter, one shutter portion having one beveled surface could be slid aside by the advancement of the stabs. Or, the shutters could be connected for manipulation by the turning of rotary shaft 84. Thus, the shutters 56 could comprise one or several sliding panels with or without beveled surfaces. In other words, shutters 56 may be operated to open and close by the movement of the stabs, by the movement of the stab assembly, by the turning of the actuating shaft, by other actuating components, or by a manual control. Regardless, once the stabs 46, 48, 50 have penetrated through shutters 56, the stabs 46, 48, 50 may be advanced or extended to engage power supply bus bars 88, 90, 92.

Also shown in FIG. 5 is a second microswitch 94 connected to activate and deactivate circuit breaker 30. When stabs 46, 48, 50 reach the fully engaged position 45 with bus bars 88, 90, 92, stab bracket 59 of stab assembly 58 actuates microswitch 94. Microswitch 94 permits closure of circuit breaker 30, completing the circuit between bus bars 88, 90, 92 and the line side of motor control components (not shown) in bucket 16.

Likewise, for removal of bucket 16, circuit breaker 30 is opened, disconnecting supply power to the motor control devices (not shown) of bucket 16. Stabs 46, 48, 50 may then be retracted from bus bars 88, 90, 92 by a reverse motion of rotary shaft 84. Once stabs 46, 48, 50 pass shutters 56, the right and left portions 62-72 thereof will automatically close together to isolate the stabs from bus bars 88, 90, 92. Preferably, the shutter portions 62-72 and all or some of the housing panels, including dead front panel 18 and a rear panel (not shown), of bucket 16 are formed of plastic or another insulating material. After stabs 46, 48, 50 have been fully retracted, automatic latch 60 will release from engagement with the motor control center, and an operator may then slide bucket 16 out of the motor control center.

Figure 6:
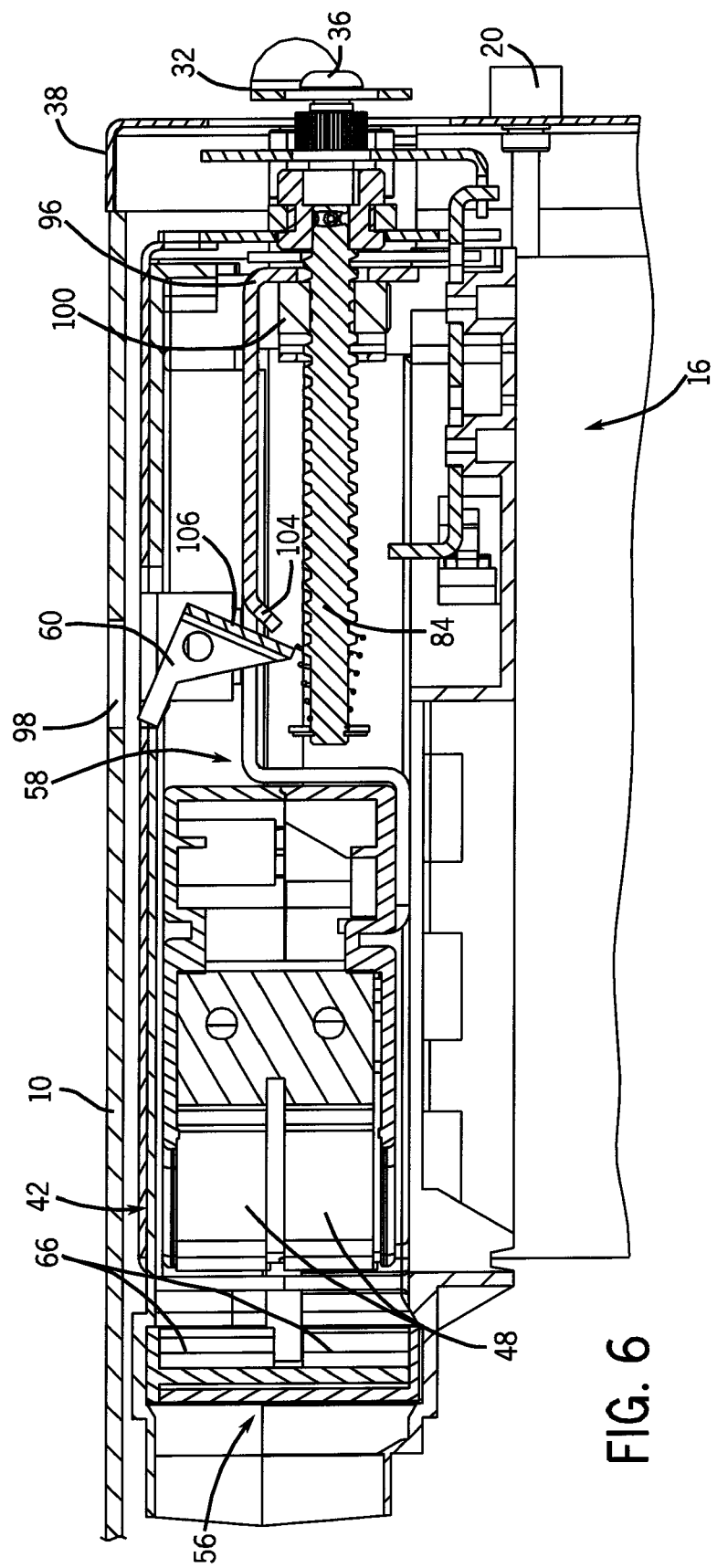
FIG. 6 is a cross-sectional view of the motor control center subunit of FIG. 3 taken along line 6-6 of FIG. 3.

Referring now to FIG. 6, a cross-sectional view of bucket 16 taken along line 6-6 of FIG. 3 is shown. The left angled portion 66 of a shutter 56 is shown isolating the central stab 48, since stab 48 is in the retracted position 42 of FIG. 3. In FIG. 6, it can be seen that stab assembly 58 holds stab 48 in position and engages rotary shaft 84, shown in section. Therefore, FIG. 6 illustrates the moving components used to actuate a stab 48. An operator may use a ratchet or crank (not shown) through opening 36 of slide 32 to turn rotary shaft or worm gear 84. A stab guide 96 includes a thread bearing 100 to transform the rotational motion of rotary shaft 84 into a translational motion of stab assembly 58. Thus, rotary shaft 84 and stab guide 96 may generally be referred to as a racking-type actuating mechanism for extending and retracting the stabs 46, 48, 50, relative to bucket 16. As stab assembly 58 is racked or otherwise advanced towards the extended or engaged position 45 shown in FIG. 5 (i.e. a motion to the left, as oriented in FIG. 6) stab 48 will impinge upon shutters 66. Also, a sloped lip 104 of stab assembly 58 will strike a bottom portion 106 of latch 60 into an upward position wherein bottom portion 106 rests on stab guide 96 and latch 60 extends through a groove 98 of motor control center 10, shown in FIG. 1, to retain bucket 16 therein.

Figure 17:
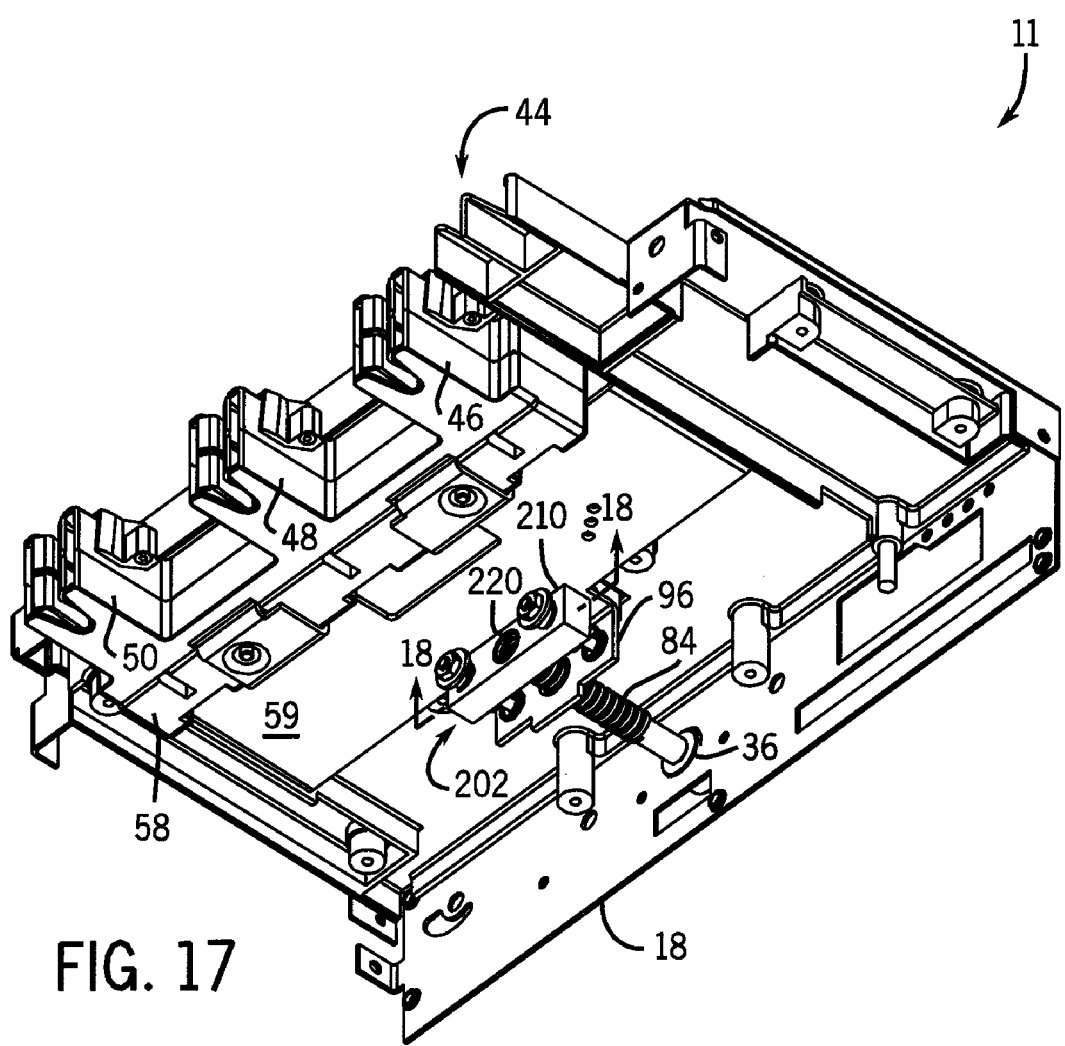
FIG. 17 is a partial perspective view of the motor control center subunit of FIG. 3 showing a clutch assembly.
Figure 18:
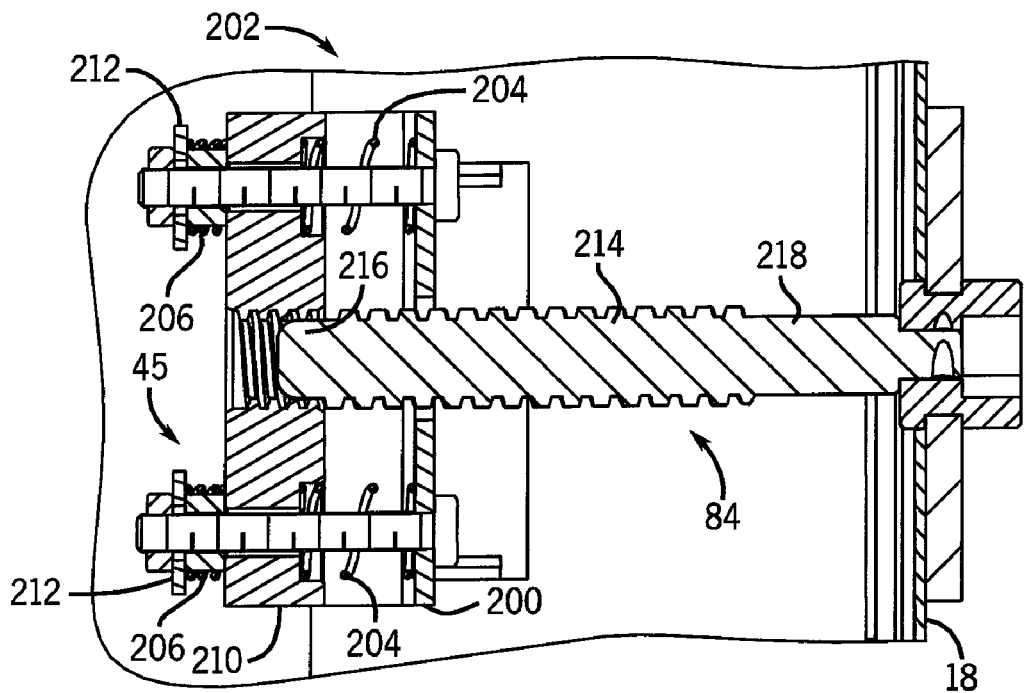
FIG. 18 is a cross-sectional view of the clutch assembly of FIG. 17 taken along line 18-18 of FIG. 17 and showing the clutch assembly in a fully engaged position.
Figure 19:
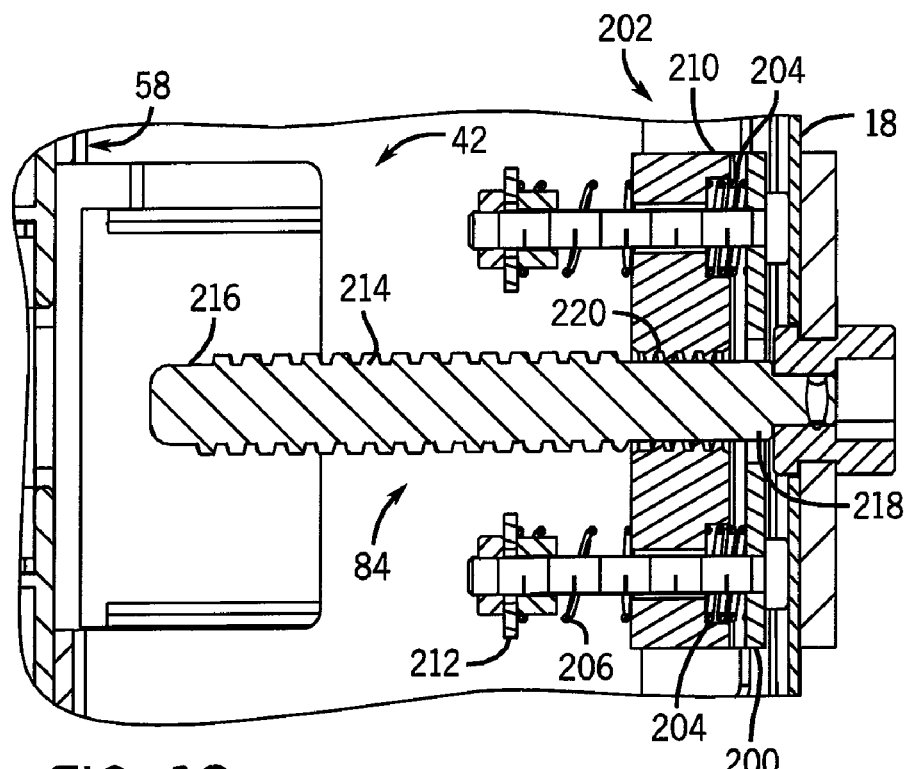
FIG. 19 is a cross-sectional view of the clutch assembly of FIG. 17 taken along line 18-18 of FIG. 17 and showing the clutch assembly in a fully retracted position.

Referring to FIGS. 17-19, a clutch mechanism 202 is shown in operation within a bucket 11. FIG. 17 depicts a partial perspective view from the bottom of bucket 11 in which clutch mechanism 202 is shown engaged with rotary drive 84. After passing through an opening 36 in the dead front panel 18 of the bucket 11, rotary drive 84 passes through a second slot in the slide plate 96 of stab bracket 59 and engages with threaded slot 220 of clutch plate 210. In operation, clutch or freewheeling mechanism 202 limits the translational movement of stab bracket 59 such that stab bracket 59 is able to translate between two limits: the maximum engaged or extended position 45 (shown with respect to the bucket 11 in FIG. 5 and with respect to the clutch mechanism in FIG. 18) and the maximum retracted position 42 (shown respect to the bucket 11 in FIG. 3 and with respect to the clutch mechanism in FIG. 19).

Referring now to FIG. 18, as threaded drive 84 is rotated and stab bracket 59 advances stab assembly 58 (FIG. 17) towards the power bus (not shown), the threaded segment 214 of rotary drive 84 engages clutch plate 210 of clutch mechanism 202. As threaded drive 84 continues to rotate, clutch plate 210 also advances axially along threaded drive 84 in the direction of the stab assembly 58 (FIG. 17) and the second set of springs 206 begin to compress. When clutch plate 210 reaches the non-threaded end 216 of the drive 84, the second set of springs 206 are fully compressed between washer 212 and clutch plate 210, and stab assembly 58 is in maximum extended (i.e., engaged) position 45 (see FIG. 5). At this point, further rotation of drive 84 results in no further advancement of stab assembly 58, as the non-threaded end 216 of drive 84 spins freely in clutch plate 210. When non-threaded end 216 of drive is free-wheeling in clutch plate 210, an audible and tactile clicking occurs as drive 84 is rotated, thus alerting an operator that the maximum extended position 54 has been reached.

Referring now to FIG. 19, to retract the stab assembly 58 from the power bus (not shown), drive 84 is rotated in the opposite direction. The second set of springs 206 impart a force between clutch plate 210 and the first thread of the threaded segment 214 of the drive 84, thus assisting with the engagement of threaded drive segment 214 and the threaded inner surface 220 of clutch plate 210. As drive 84 is rotated further and stab assembly 58 advances axially along threaded drive 84 towards the maximum retracted position 42, clutch plate 210 advances along the threaded drive segment 214 towards non-threaded segment 218 and the first set of springs 204 compress. When stab assembly 58 (and stab bracket 59) reaches maximum retracted position 42, drive 84 freely rotates about non-threaded drive segment 218, the second set of springs 204 is compressed, and further rotation of drive 84 produces no additional translation in the retraction direction. Additionally, further rotation of drive 84 results in an audible and tactile clicking to alert an operator that the maximum retracted position 42 has been reached. To begin axial translation of stab assembly 58 towards the fully engaged position, drive 84 is rotated in the opposite direction and the force resulting from the compression of the first set of springs 204 assists in engaging the threaded inner surface 220 of clutch plate 210 and threaded drive segment 214.

By thus limiting advancement of stab assembly 58 between maximum retracted position 42 (FIG. 19) and maximum engaged position 45 (FIG. 18), clutch mechanism 202 prevents damage resulting from over torquing or overdrive of the rotary drive 84 inside bucket 11.

Figure 16:
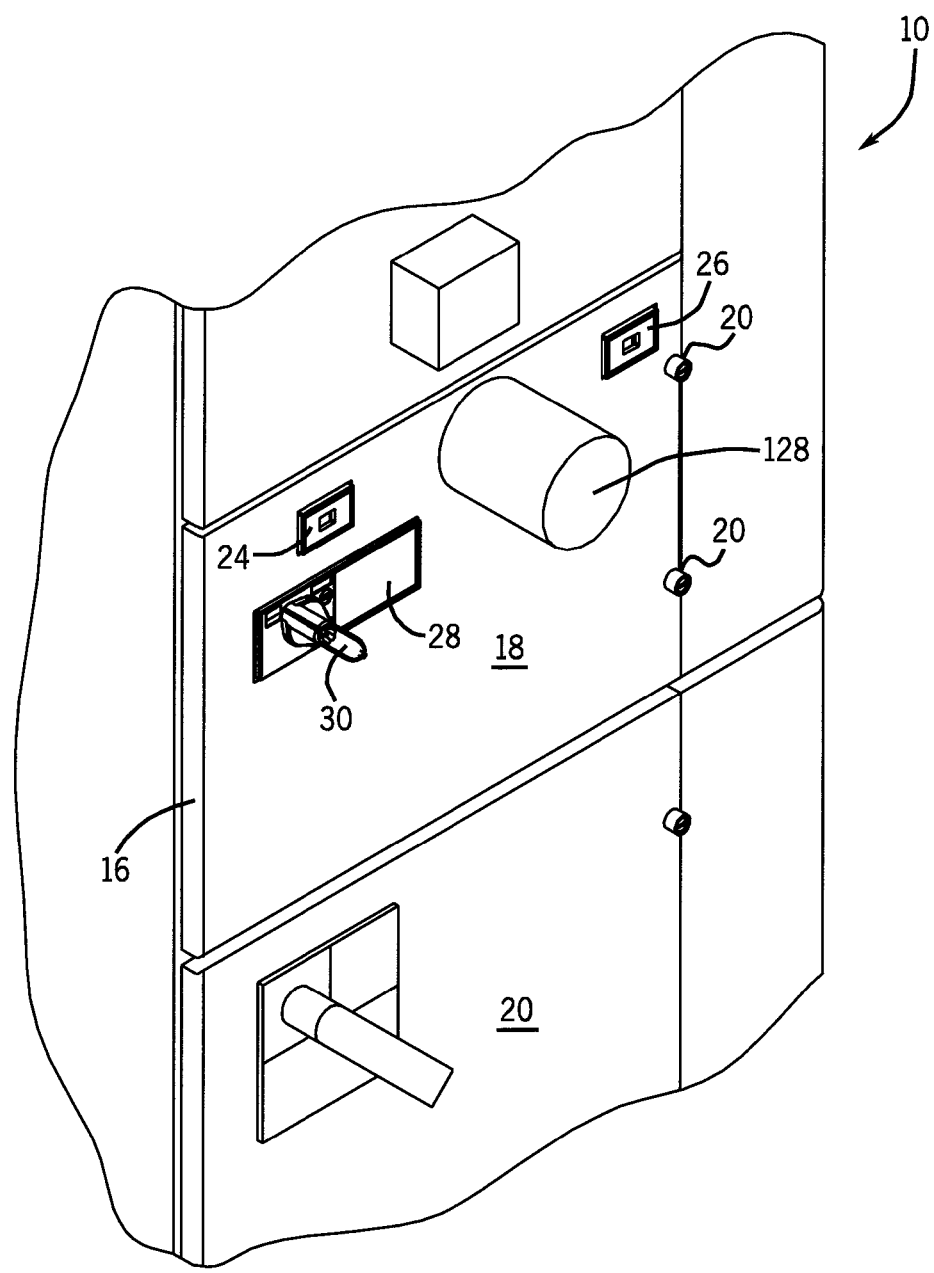
FIG. 16 is a partial perspective view of the motor control center subunit of FIG. 1 showing an alternate embodiment.

Although clutch mechanism 202 has been described in detail in connection with the rotary drive 84, it is appreciated that clutch mechanism 202 can also be utilized in a similar manner with any form of stab racking mechanism such as manually drivable handle 116 (described in detail with respect to FIGS. 9-12) or a motor drive 128 (described in more detail with respect to FIG. 16). It is further contemplated that a separate clutch mechanism could be incorporated with each of the non-threaded ends of the drive, such that a first clutch mechanism would limit over-racking of the stab assembly during engagement of the stabs and a second clutch mechanism would limit over-racking of the stab assembly during retraction of the stabs. Additionally, clutch mechanism 202 can be incorporated into other low voltage assemblies where there is a need to provide an enhanced degree of arc flash safety, such as busway plug-in systems components, panel board system component assemblies, system components used in distribution switchboard assemblies, and other systems where a plug-in assembly is remotely racked in and out from a remote location.

Figure 7:
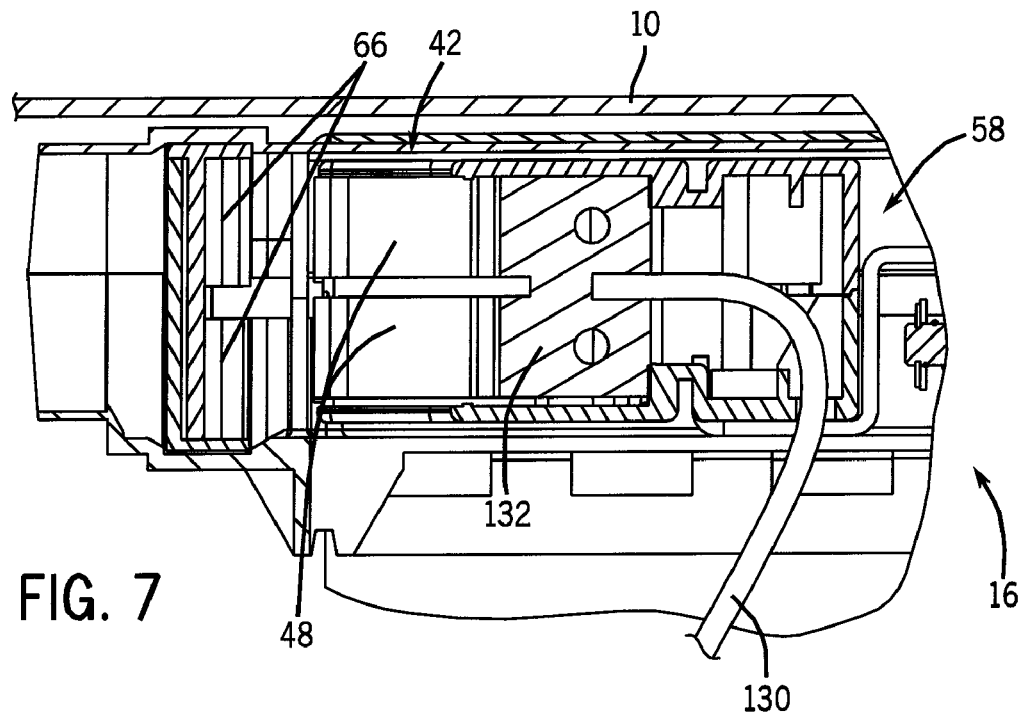
FIG. 7 is a detailed view of a portion of the motor control center subunit of FIG. 6 showing an arc shield, line contact, and supply conductor thereof.
Figure 8:
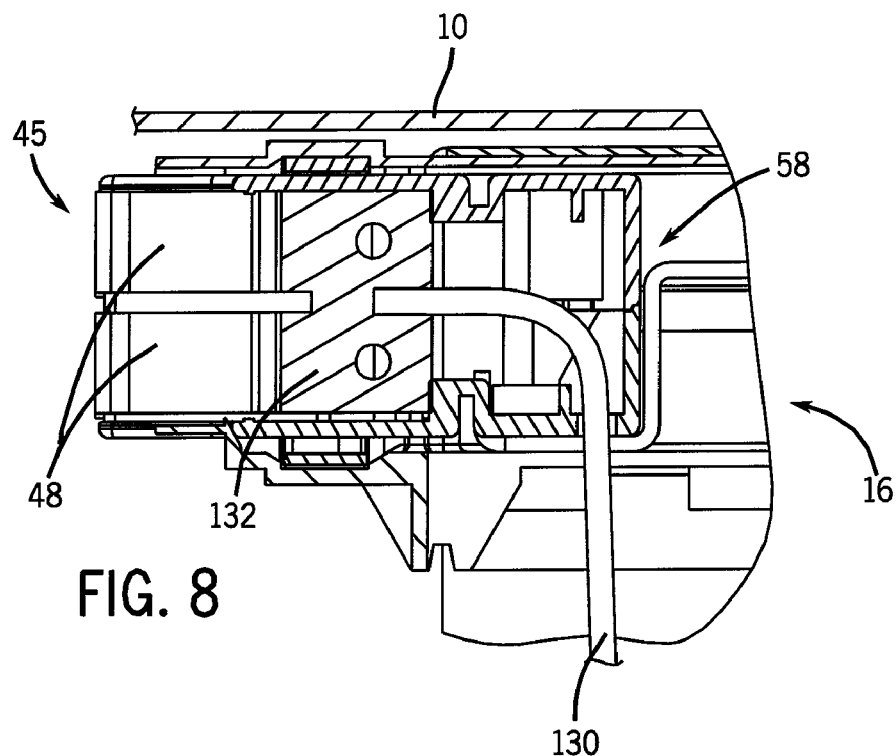
FIG. 8 is a detailed view of the motor control center subunit of FIG. 7 showing line contact extension.

FIG. 7 is an enlarged view of the stab 48 and shutter 66 area of the cross-sectional view of FIG. 6. Conductive stab 48 is coupled to a flexible conductor 130, such as a cable, via a coupling portion 132 of stab assembly 58. Flexible conductor 130 is of a construction suitable to conduct supply power, via stab 48, to the line side of a motor control component (not shown). As shown in FIG. 8, when stab 48 and stab assembly 58 are racked or otherwise advanced forward to an extended position 45, flexible conductor 130 flexes to maintain electrical connectivity with stab 48 via coupler 132. Accordingly, the motion of stab 48 relative to bucket 16 does not interfere with the connectivity of the stab 48 with a motor control component.

Figure 9:
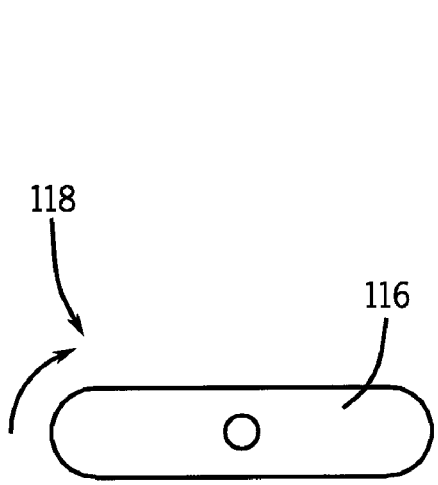
FIG. 9 is a plan view of a control handle of one embodiment of the present invention.
Figure 10:
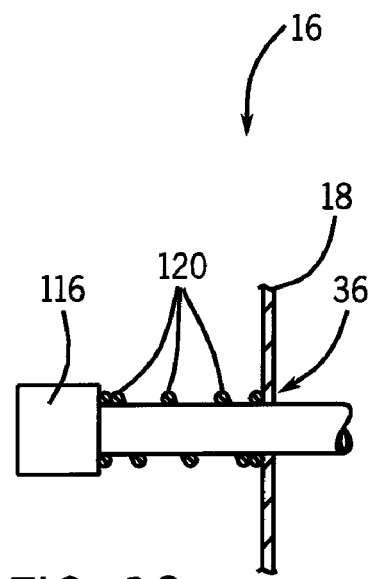
FIG. 10 is a side view of the control handle of FIG. 9.
Figure 11:
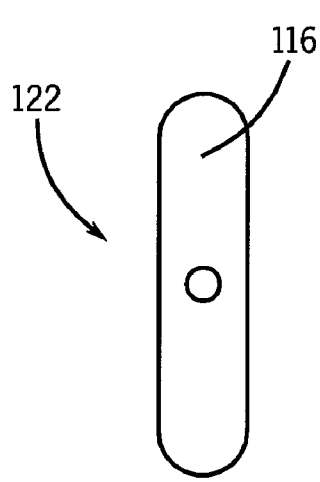
FIG. 11 is a plan view showing the control handle of FIG. 9 rotated ninety degrees.
Figure 12:
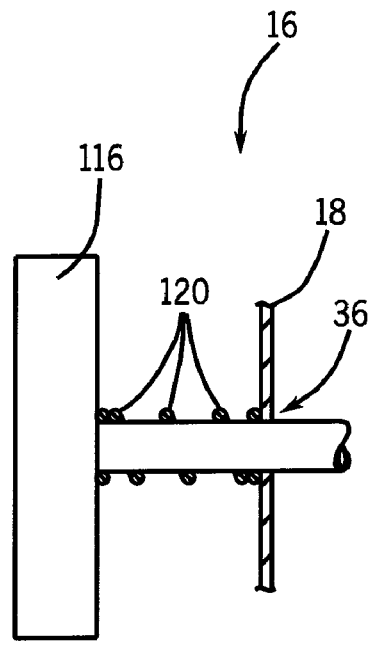
FIG. 12 is a side view of the control handle of FIG. 11.
Figure 13:
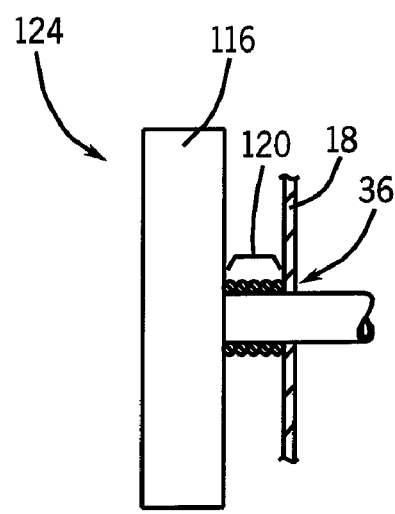
FIG. 13 is a side view showing the control handle of FIG. 11 depressed into a motor control center subunit.
Figure 14:
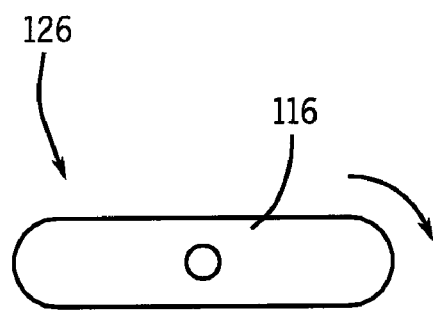
FIG. 14 is a plan view showing the control handle of FIG. 11 rotated ninety degrees.
Figure 15:
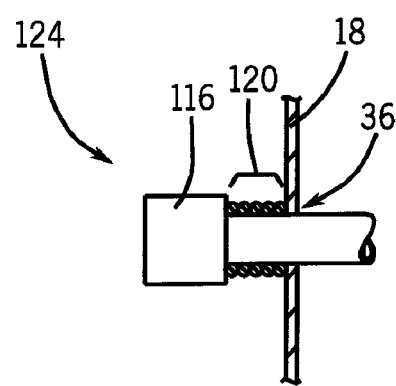
FIG. 15 is side view of the control handle of FIG. 14.

Referring now to FIGS. 9-15, an alternative stab actuating feature is shown. A manually drivable handle 116 may replace or be used in combination with the crank 34 of FIG. 1 and the racking mechanism of FIG. 6. In such embodiments, the rotary shaft or worm gear 84 depicted in previous embodiments may be replaced with a non-tapped shaft or rod directly connected to stab assembly 58. FIG. 9 shows such a handle 116 in a locked, starting position 118 that corresponds to the stabs disengaged position 42 of FIG. 3. As shown in FIG. 10, handle 116 is separated and biased from dead front panel 18 of a bucket by a spring 120 and extends through stab actuating opening 36. By rotating handle 116 ninety degrees, as shown in FIGS. 11 and 12, handle 116 may be unlocked 122. In some embodiments, an interlock system may be included to prevent unlocking of handle 116 until bucket 16 is fully installed into a motor control center. Such an interlock may be incorporated into the shaft 84 of handle 116. Once unlocked, handle 116 may be driven or depressed towards dead front panel 18, compressing spring 120, as shown in FIG. 14. The depressed position 124 of handle 116 corresponds to the stabs engaged position of FIG. 5. Handle 116 may then be rotated another ninety degrees 126, as shown in FIGS. 15 and 16, to lock the handle in the stabs engaged position 124, against the force of spring 120. For disengagement of the stabs, handle 116 is rotated to unlocked orientation 122, pulled outward to the stab disengaged position 42 and turned ninety degrees to a locked position 118. In a general sense, therefore, embodiments of the present invention may include various configurations of simplified, manual actuation of the stabs, similar to that shown in FIGS. 9-15.

In other embodiments, it may be desirable to use more automated actuation of the stabs of a motor control center. Accordingly, FIG. 16 depicts an embodiment of a motor control center bucket 16 in which a motor drive 128 is included. Motor drive 128 may replace or augment a racking mechanism or a manual actuation system, such as described above. Preferably, motor drive 128 is a small DC motor and may be powered by a battery or by an electrical connection with motor control center 10, such as via the control power contact 44 shown in FIG. 2 or a similar plug or connection. It is recognized, however, that many other types, sizes, and configurations of motor drive 128 are equivalently applicable. For example, it may be desirable to connect motor drive 128 inside bucket 16. Further, it is contemplated that motor drive 128 could be remotely operable, and could be either hardwired or wirelessly connected for operation. It is also contemplated that motor drive 128 may be connected remotely via an elongated shaft or cable to operate rotary shaft 84 from a distance.

Accordingly, one embodiment of the present invention includes a motor control center subunit includes a housing, a drive mechanism attached to the housing and configured to translate a plurality of selectively moveable conductive contacts between a retracted position and an extended position within the housing, and a freewheeling mechanism attached to the drive mechanism and configured to define the retracted position and the extended position of the conductive contacts. The conductive contacts are moveable when the housing is seated in a motor control center and a front panel of the housing is in a closed position.

According to another embodiment of present invention, a motor control center includes a motor control center frame having at least one compartment and a motor control center subunit housing constructed to seat in the at least one compartment of the motor control center frame. The motor control center also includes an actuating mechanism attached to the motor control center subunit to control movement of a plurality of conductive contacts and a clutch configured to define a range of movement of the plurality of conductive contacts, with the range of movement having ends at a fully engaged position and a fully retracted position.

According to yet another embodiment of the present invention, a motor control center subunit includes a control module housing having a plurality of conductive contacts therein and an actuating mechanism to control movement of a plurality of conductive line contacts when a front panel of the housing is in a closed position. The motor control center subunit also includes a means for preventing the actuating mechanism from translating past a maximum extended position and a maximum retracted position.

The present invention has been described in terms of the preferred embodiment, and it is recognized that equivalents, alternatives, and modifications, aside from those expressly stated, are possible and within the scope of the appending claims.

What is claimed is:

1. A motor control center subunit comprising:
   a housing;
   a drive mechanism attached to the housing and configured to translate a plurality of selectively moveable conductive contacts between a retracted position and an extended position within the housing;
   a freewheeling mechanism attached to the drive mechanism and configured to allow the drive mechanism to free-wheel therein when the conductive contacts are at the retracted position and the extended position; and
   wherein the conductive contacts are moveable when the housing is seated in a motor control center and a front panel of the housing is in a closed position.

2. The motor control center subunit of claim 1 further comprising a conductive contacts assembly configured to position the plurality of conductive contacts for engagement with at least one supply bus when the plurality of conductive contacts is in the extended position.

3. The motor control center subunit of claim 2 wherein the conductive contacts assembly is further configured to convert a rotational movement of the drive mechanism into a movement of the plurality of conductive contacts.

4. The motor control center subunit of claim 3 wherein the drive mechanism comprises a rotary drive mechanism that includes at least one threaded section and at least one non-threaded section.

5. The motor control center subunit of claim 4 wherein the conductive contacts are moved in an axial direction when the threaded portion of the drive mechanism is engaged with the contact assembly.

6. The motor control center subunit of claim 4 wherein the conductive contacts remain stationary when the non-threaded portion of the drive mechanism is engaged with the contact assembly.

7. The motor control center subunit of claim 4 wherein the threaded section of the rotary drive mechanism is disposed between two non-threaded sections of the rotary drive mechanism.

8. The motor control center subunit of claim 2 wherein the freewheeling mechanism prevents the conductive contacts assembly from retracting the conductive contacts past the location of the retracted position.

9. The motor control center subunit of claim 2 wherein the freewheeling mechanism prevents the conductive contacts assembly from extending the conductive contacts past the location of the extended position.

10. The motor control center subunit of claim 2 wherein the drive mechanism is configured to interact with the freewheeling mechanism to emit an audible and tactile clicking when rotated with the conductive contacts at the retracted position and the extended position.

11. A motor control center comprising:
   a motor control center frame having at least one compartment;
   a motor control center subunit housing constructed to seat in the at least one compartment of the motor control center frame;
   an actuating mechanism attached to the motor control center subunit to control movement of a plurality of conductive contacts; and
   a clutch configured to define a range of movement of the plurality of conductive contacts, the range of movement having ends at a fully engaged position and a fully retracted position.

12. The motor control center of claim 11 further comprising a slide plate disposed on a front edge of the actuating mechanism.

13. The motor control center of claim 11 further comprising a rotary screw engageable with the actuating mechanism and the clutch, the rotary screw configured to cause axial movement of the conductive contacts.

14. The motor control center of claim 11 wherein the clutch comprises a clutch plate disposed between a first set of springs and a second set of springs.

15. The motor control center of claim 14 wherein, when the conductive contacts are in a fully engaged position, the slide plate abuts the clutch plate, the first set of springs is compressed, and an additional extension of the conductive contacts beyond the fully engaged position is prevented.

16. The motor control center of claim 14 wherein, when the conductive contacts are in a fully retracted position, the second set of springs is compressed and an additional retraction of the conductive contacts past the fully retracted position is prevented.

17. A motor control center subunit comprising:
   a control module housing having a plurality of conductive contacts therein;
   an actuating mechanism to control movement of a plurality of conductive line contacts when a front panel of the housing is in a closed position; and
   means for preventing the actuating mechanism from translating past a maximum extended position and a maximum retracted position;
   wherein the actuating mechanism free-wheels in the maximum extended position and the maximum retracted position.

18. The motor control center subunit of claim 17 further comprising means for transitioning the actuating mechanism between the maximum extended position and a conductive contacts translation range.

19. The motor control center subunit of claim 17 further comprising means for transitioning the actuating mechanism between the maximum retracted position and a conductive contacts translation range.

20. The motor control center subunit of claim 17 wherein the actuating mechanism comprises a rotary drive.

21. The motor control center subunit of claim 17 wherein the plurality of conductive contacts are fully engaged with a power supply bus at the maximum extended position.

22. The motor control center subunit of claim 17 wherein the plurality of conductive contacts are fully retracted from the power supply bus at the maximum retracted position.

* * * * *